(12) United States Patent
Kudo

(10) Patent No.: US 9,567,441 B2
(45) Date of Patent: Feb. 14, 2017

(54) SILICONE AND USE THEREOF

(71) Applicant: SHIN-ETSU CHEMICAL CO., LTD., Tokyo (JP)

(72) Inventor: Muneo Kudo, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 15/136,027

(22) Filed: Apr. 22, 2016

(65) Prior Publication Data

US 2016/0311981 A1 Oct. 27, 2016

(30) Foreign Application Priority Data

Apr. 23, 2015 (JP) ................. 2015-088462

(51) Int. Cl.
| | | |
|---|---|---|
| C07F 7/04 | (2006.01) |
| C08G 77/20 | (2006.01) |
| C08G 77/16 | (2006.01) |
| G02B 1/04 | (2006.01) |
| C08G 77/06 | (2006.01) |
| C08J 5/18 | (2006.01) |
| C08F 290/06 | (2006.01) |

(52) U.S. Cl.
CPC ............ *C08G 77/20* (2013.01); *C08G 77/06* (2013.01); *C08G 77/16* (2013.01); *C08J 5/18* (2013.01); *G02B 1/043* (2013.01); *C08F 290/068* (2013.01); *C08J 2383/07* (2013.01)

(58) Field of Classification Search
CPC ............... C08G 77/20; C08J 5/18; C07F 7/04
USPC ......................................................... 556/440
See application file for complete search history.

(56) References Cited

U.S. PATENT DOCUMENTS

| 8,415,405 B2 * | 4/2013 | Maggio ................ C07F 7/0854 523/107 |
| 2009/0234089 A1 | 9/2009 | Ueyama et al. |
| 2012/0184698 A1 | 7/2012 | Ueyama et al. |

FOREIGN PATENT DOCUMENTS

| JP | 62-29776 B2 | 6/1987 |
| JP | 5490547 B2 | 5/2014 |
| WO | WO 2009/099164 A1 | 8/2009 |

* cited by examiner

*Primary Examiner* — Porfirio Nazario Gonzalez
*Assistant Examiner* — Kofi Adzamli
(74) *Attorney, Agent, or Firm* — Birch, Stewart, Kolasch & Birch, LLP

(57) ABSTRACT

One of the purposes of the present invention is to provide a polysiloxane which has polymerizable groups at the both terminals, is well compatible with another hydrophilic monomer, and provides a (co)polymer having improved durability of mechanical strengths. The present invention provides a compound represented by the formula (1) having a group represented by the formula (3) as a hydrophilic side chain, which is characterized in that the hydrophilic side chain has an alkyl group having three hydroxyl groups and no ether bond. Further, the present invention provides a method for preparing the silicone.

9 Claims, No Drawings

SILICONE AND USE THEREOF

CROSS REFERENCE

This application claims the benefits of Japanese Patent Application No. 2015-088462 filed on Apr. 23, 2015, the contents of which are hereby incorporated by reference.

FIELD OF THE INVENTION

The present invention relates to a silicone which is useful as starting materials for preparing ophthalmic devices. Specifically, the present invention relates to a silicone which has (meth)acryl groups in the both terminals and is copolymerizable with other polymerizable monomer for preparing ophthalmic devices to form a crosslinking structure to thereby provide a polymer having a flexibility and being suitable for an ophthalmic devices such as contact lenses, e.g. hydrophilic contact lenses and silicone hydrogels, intraocular lenses and artificial corneas, and a method for preparing the silicone.

Various polymerizable silicone monomers which are useful as starting materials for preparing ophthalmic devices having oxygen permeability and hydrophilicity, in particular starting materials for contact lenses, has been developed. Specifically, a polysiloxane having polymerizable groups at the both terminals and a hydrophilic side chain is developed as a starting materials for contact lenses having high oxygen permeability. For instance, Japanese Examined Patent Publication No. Sho62-29776 describes a hydrophilic contact lens prepared using a polysiloxane having polymerizable groups at the both terminals and a hydrophilic side chain as a monomer compound. The hydrophilic side chain is the groups represented by the following formula (a) or (b).

(a)

wherein n is 2 or 3.

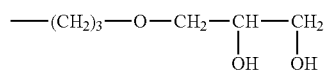

(b)

Japanese Patent No. 5490547 describes a polysiloxane which has polymerizable groups at both terminals of the main chain and has a polyoxyethylene side chain represented by the following formula, as a starting material of contact lenses having high oxygen permeability and hydrophilicity and a proper strength and elasticity.

(c)

wherein n is an integer of from 4 to 100 and R is a hydrogen atom or a hydrocarbon atom having 1 to 4 carbon atoms.

The polysiloxane described in Patent literatures 1 and 2 do not have an urethane bond, so that they are suitable for medical purpose.

PRIOR LITERATURES

Patent Literature 1: Japanese Examined Patent Publication No. Sho62-29776
Patent Literature 2: Japanese Patent No. 5490547

SUMMARY OF THE INVENTION

However, the hydrophilicity of the polysiloxane whose hydrophilic side chain is an alkyl group having an ether bond and two hydroxyl groups, such as represented by the aforesaid formula (b), is insufficient and, therefore, the polysiloxane is bad compatible with other hydrophilic monomer. Further, a polymer obtained from the polysiloxane has poor durability of the mechanical strength because the ether bond is hydrolyzed and cleaved. A polymer obtained from the polysiloxane whose hydrophilic side chain is a polyether group, such as represented by the aforesaid formula (a) or (c), has also poor durability of the mechanical strength because the polyether group is degraded by oxidation or hydrolyzed.

One of the purposes of the present invention is to provide a polysiloxane which has polymerizable groups at the both terminals, is well compatible with another hydrophilic monomer, and provides a (co)polymer having improved durability of mechanical strength. In the present invention, the durability of mechanical strength means that a mechanical strength of a polymer, such as tensile strength and rupture elongation, does not deteriorate in a phosphate buffer solution.

The present inventors have made research to solve the afore-mentioned problems and found that a silicone represented by the following formula (1) is well compatible with other hydrophilic monomers and provides a (co)polymer which has improved durability of mechanical strength.

Thus, the present invention provides a compound represented by the following formula (1):
A silicone represented by the following formula (1):

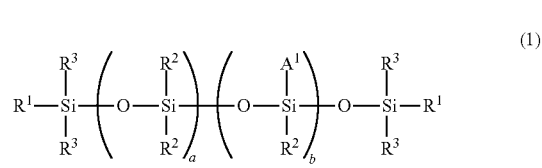

(1)

wherein $R^1$ is, independently of each other, a group represented by the following formula (2):

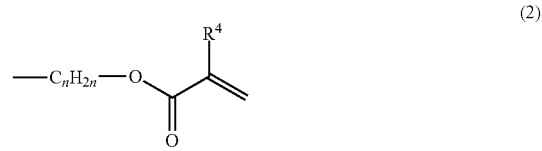

(2)

wherein n is an integer of from 2 to 8, and $R^4$ is a methyl group or a hydrogen atom, $R^2$ is, independently of each other, a substituted or unsubstituted, monovalent hydrocarbon group having 1 to 10 carbon atoms, $R^3$ is, independently of each other, an alkyl group having 1 to 6 carbon atoms, $A^1$ is a group represented by the following formula (3):

(3)

wherein m is an integer of from 2 to 10, X is an alkyl group having three hydroxyl groups, represented by $-C_pH_{2p-2}(OH)_3$ and, may be branched, and p is an integer of from 1 to 6, a is an integer of from 1 to 500, b is an integer of from 1 to 100, and a total of a and b is 50 to 600.

Further, the present invention provides a method for preparing the silicone.

EFFECTS OF THE INVENTION

The present silicone is well compatible with other hydrophilic monomers and provides a (co)polymer which has improved durability of mechanical strength. The present silicone has a polysiloxane structure and, therefore, it provides a (co)polymer having high oxygen permeability. Accordingly, the present silicone is useful for preparing ophthalmic devices.

DETAILED DESCRIPTION OF THE INVENTION

The present silicone is represented by the aforesaid formula (1), and has a group represented by the aforesaid formula (3) as a hydrophilic side chain. Specifically, the silicone is characterized in that the hydrophilic side chain has an alkyl group having three hydroxyl groups and no ether bond. On account of the aforesaid specific structures, the present silicone has high hydrophilicity and is well compatible with other hydrophilic monomers. Further, the hydrophilic side chain is less affected by oxidation degradation and hydrolysis and, therefore, the silicone provides a (co)polymer having improved durability of the mechanical strength. If the hydrophilic side chain has an ether bond, the bond is likely to be degraded by oxidation and hydrolyzed and a (co)polymer obtained from the silicone has poor durability of the mechanical strength. If the number of the hydroxyl group bonded to an alkyl group is less than three, a hydrophilicity of the silicone is insufficient and, therefore, the silicone is poorer compatible with other hydrophilic monomers and does not provide a colorless and transparent polymer.

In the aforesaid formula (1), $R^1$ is a group represented by the following formula (2):

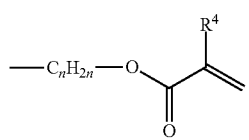

(2)

wherein n is an integer of from 2 to 8, preferably 3 or 4, and $R^4$ is a methyl group or a hydrogen atom.

In the aforesaid formula (1), $R^2$ is, independently of each other, a substituted or unsubstituted, monovalent hydrocarbon group having 1 to 10 carbon atoms, preferably 1 to 6 carbon atoms. Examples of the monovalent hydrocarbon group include an alkyl group such a methyl group, an ethyl group, a propyl group, a butyl group, a pentyl group and a hexyl group; cycloalkyl group such as a cyclohexyl group; an aryl group such as a phenyl group, a tolyl group and a naphthyl group; an aralkyl group such as a benzyl group, a phenylethyl group and a phenylpropyl group; and an alkenyl group such as a vinyl group and an allyl group; and those hydrocarbon groups wherein a part or all of the hydrogen atoms bonded to the carbon atoms are substituted with a substituent such as a halogen atom such as a fluorine atom, a chlorine atom and a bromine atom, e.g., halogen-substituted monovalent hydrocarbon groups such as trifluoropropyl group. Among these, a methyl group is preferred.

In the aforesaid formula (1), $R^3$ is, independently of each other, an alkyl group having 1 to 6 carbon atoms, preferably 1 to 4 carbon atoms, such as a methyl group, an ethyl group, a propyl group, a butyl group, a pentyl group and a hexyl group. Among these, a methyl group is preferred.

In the aforesaid formula (1), $A^1$ is a group represented by the following formula (3):

$$—C_mH_{2m}—X \qquad (3)$$

wherein m is an integer of from 2 to 10, preferably an integer of from 4 to 7.

In the formula (3), X is an alkyl group having three hydroxyl groups, represented by $—C_pH_{2p-2}(OH)_3$ and, may be branched. p is an integer of from 1 to 6, preferably 3 to 6. Examples of an alkyl group include a methyl group, an ethyl group, a propyl group, an isopropyl group, a butyl group, a tert-butyl group, an isobutyl group, a sec-butyl group, a methylbutyl group, a dimethylbutyl group, a pentyl group, a methylpentyl group and a hexyl group. Three of the hydrogen atoms bonded to the carbon atoms of the aforesaid alkyl group are respectively substituted with a hydroxyl group. Preferred are the group having a structure of a propyl group, an isopropyl group, a butyl group, a tert-butyl group, an isobutyl group, and a sec-butyl group. The three hydroxyl groups may bond to one carbon atom, but preferred is that the number of a hydroxyl group bonded to one carbon atom is one.

X in the aforesaid formula is preferably a group represented by the following formula (4) or (5).

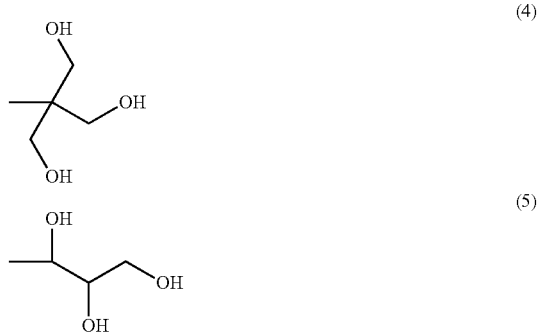

In the formula (1), a is an integer of from 1 to 500, preferably 50 to 300, b is an integer of from 1 to 100, preferably 4 to 40, provided that a total of a and b is 50 to 600, preferably 80 to 340, particularly 100 to 300. If the total of a and b is less than the aforesaid lower limit, it is difficult to provide a polymer having proper flexibility. If the total of a and b is more than the aforesaid upper limit, the silicone is poor compatible with other hydrophilic monomer. In particular, it is preferred in view of a valance of the hydrophilicity and a hydrophobicity of a siloxane that the each number of a and b is in the aforesaid range and the ratio of a to b is 10 to 50.

The present invention further provides a method for preparation of the silicone represented by the aforesaid formula (1). The method comprises the first step and the second step as described below in detail.

The first step of the present method is that an organohydrogenpolysiloxane represented by the following formula (6):

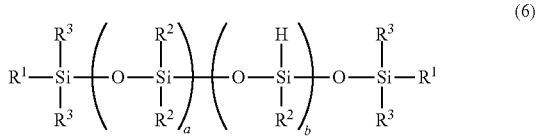

(6)

wherein $R^1$, $R^2$, $R^3$, a and b are as defined above;
is addition reacted with a compound having a unsaturated hydrocarbon group and represented by the following formula (7):

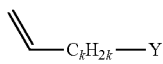

(7)

wherein k is an integer of from 0 to 8, preferably 2 to 5, Y is a group represented by $-C_pH_{2p-2}(OR)_3$, p is an integer of from 1 to 6, and R is a protective group for a hydroxyl group,
to thereby obtain a compound represented by the following formula (8)

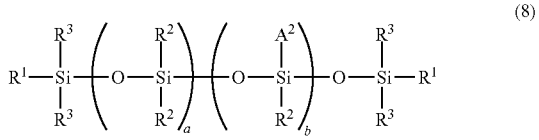

(8)

wherein $R^1$, $R^2$, $R^3$, a and b are as defined above and $A^2$ is a group represented by the following formula (9):

$$-C_mH_{2m}-Y \qquad (9)$$

wherein m and Y are as defined above.

In the aforesaid formulas (7) and (9), Y is a group obtained by protecting the three hydroxyl groups in the aforesaid group represented by X with a protective group, R. In particular, Y is a group represented by the following formula (10) or (11).

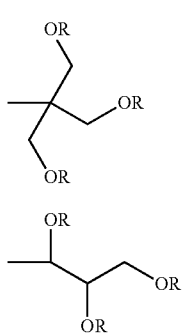

(10)

(11)

wherein R is a protective group for a hydroxyl group.

The protective group, R, may be conventional one. Examples of the protective groups include an acyl group such as an acetyl group and a methoxyacetyl group, an alkyl group such as a tert-butyl group, an aralkyl group such as a benzyl group, an ether group such as a methoxymethyl group, and a silyl group represented by $-SiR^6R^7R^8$. The silyl group represented by $-SiR^6R^7R^8$ is preferred. $R^6$, $R^7$ and $R^8$ are, independently of each other, an alkyl group having 1 to 4 carbon atoms, a benzyl group or a phenyl group. Examples of an alkyl group include a methyl group, an ethyl group, a propyl group, a isopropyl group, a butyl group and a tert-butyl group. Among these, methyl group is preferred. Examples of the silyl group represented by $-SiR^6R^7R^8$ include trimethylsilyl (TMS) group, triethylsilyl (TES) group, triisopropylsilyl (TIPS) group, tert-butyldimethylsilyl (TBDMS) group, tribenzylsilyl group and tert-butyldiphenylsilyl (TBDPS) group. The alkyl silyl group is preferred and trimethylsilyl (TMS) group is further preferred. On account of protecting with the silyl group, a protection and a deprotection are carried out in a relatively mild conditions and a side reaction is less.

For instance, the compound represented by the aforesaid formula (7) wherein the R in Y: $-C_pH_{2p-2}(OR)_3$ is a silyl group, $-SiR^6R^7R^8$, is prepared by reacting a hydroxyl group of an alkenylalcohol with at least one kind of silylating agent to be silylether. The reaction may be conducted in known manners for a silylation. For instance, the reaction is conducted in a solvent such as DMF or THF in the presence of a base such as imidazole. Any conventional silylating agent may be used. For instance, compounds represented by the following formulas are used.

wherein $R^6$, $R^7$ and $R^8$ are as defined above.

Examples of the silylating agent include hexamethyldisilazane, trimethylchlorosilane, triisopropylchlorosilane and tert-butyldimethylchlorosilane. Preferred are hexamethyldisilazane, trimethylchlorosilane and a mixture of these.

The alkenylalcohol is represented by the following formula:

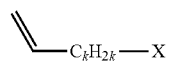

wherein k and X are as defined above.

For instance, the following compounds are included.

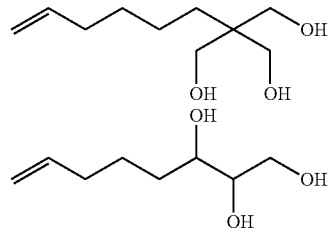

Examples of the compound represented by the aforesaid formula (7) include the compounds represented by the following formulas.

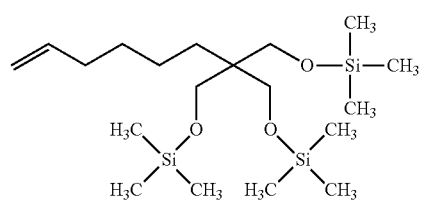

-continued

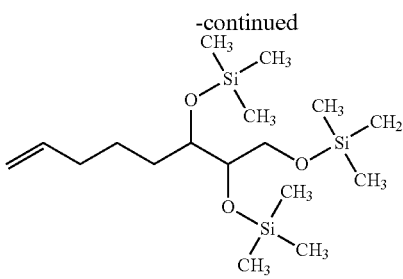

The addition reaction may be carried out in any conventional manners. For instance, the reaction is carried out in the presence of a hydrosilylation catalyst such as platinum group metal compounds. A solvent may be used. Examples of the solvent include aliphatic or aromatic solvents such as hexane, methylcyclohexane, ethylcyclohexane and toluene; and alcoholic solvents such as ethanol and IPA. A ratio of the aforesaid compounds to be used may be according to conventional manners. The amount is such that a ratio of the number of unsaturated group in the compound represented by the formula (7) to the number of SiH group in the organohydrogenpolysiloxane represented by the formula (6) is 1 or more, preferably 1.05 or more. The upper limit of the ratio may be usually 2 or less, particularly 1.5 or less, but is not limited to them.

It is preferred that the compound represented by the formula (7) is optionally diluted with a solvent to which, then, a hydrosilylation catalyst of platinum family is added. Any conventional hydrosilylation catalysts of platinum family may be used and not limited to any particular one. Subsequently, the organohydrogenpolysiloxane is added dropwise to the mixture to react at room temperature or a higher temperature. After the completion of the addition, the reaction mixture is held under heating. An amount of remaining SiH group in the reaction liquid is determined in a known manner to confirm the end point of the reaction. For instance, a determination of an amount of a hydrogen gas generated is conducted to determine an amount of remaining SiH group. After the end point of the reaction is confirmed, the solvent is removed from the reaction liquid. The unreacted polyorganohydrogensiloxane does not remain in a product, so that a silicone obtained has one specific structure at a higher ratio. The aforesaid addition reaction may be conducted in one step.

After the completion of the addition reaction, an excessive compound represented by the formula (7) is removed from the reaction liquid. For instance, the reaction liquid is subjected to stripping under a reduced pressure, or washed with ion exchanged water or an aqueous sodium sulfate solution to extract the vinyl ether compound into an aqueous phase. Here, a proper amount of solvent, such as toluene and hexane, may preferably be used to attain clear phase separation. The excessive compound represented by the formula (7) may be converted to an alkenyl alcohol compound, which has a high water-solubility, in the second step to be washed with water, extracted in an aqueous phase and removed.

The second step in the present method is that the protective group for the hydroxyl group, R, is removed from the group, $-C_pH_{2p-2}(OR)_3$, in said compound represented by the formula (8) to thereby prepare the silicone represented by the aforesaid formula (1), hereinafter referred to as deprotection step.

The deprotection may be carried out in the conventional manners. For instance, a deprotection of a silyl group, i.e. desilylation, is preferably carried out in the presence of an acid in order to accelerate the reaction. Examples of the acid include sulfuric acid, hydrochloric acid, acetic acid, trifluoromethanesulfonate and trifluoroacetic acid. Preferred is trifluoromethanesulfonate or trifluoroacetic acid, which contains no water. A concentration of the acid is preferably 0.01 to 5% by mass.

The deprotection reaction may be carried out in a proper solvent in which the compound represented by the formula (8) can dissolve. The solvent is preferably non-aqueous solvent, for instance, alcohols such as a methanol, an ethanol, a n-propylalcohol, and i-propylalcohol. If the solvent includes water, the siloxane bond of the silicone cleaves.

The temperature and time for the deprotection may be properly selected depending on an acid and a solvent and, preferably, the temperature is 40 to 80 degrees C. and the time is 1 to 10 hours. After the deprotection, the solvent is removed to thereby obtain the intended silicone which is deprotected, represented by the formula (1).

In the first and second steps, a polymerization inhibitor may be added, if needed. Any conventional polymerization inhibitor for a (meth)acryl compound may be used, such as, for instance, a phenol type polymerization inhibitor such as hydroquinone, hydroquinone monomethyl ether, 2-tert-butyl hydroquinone, 4-methoxy phenol and 2,6-di-tert-butyl-4-methylphenol (BHT). These may be used singly or two or more of them may be used in combination. The amount is preferably 5 to 500 ppm, further preferably 10 to 100 ppm, based on an amount of compound to be obtained, but is not limited to these.

The organohydrogenpolysiloxane represented by the formula (6) is prepared in the known manners. In particular, (meth)acrylic silicone dimer is used as a starting material for making a terminal. The (meth)acrylsilicon dimer is, for instance, represented by the following formula:

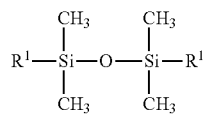

wherein $R^1$ is as defined above.

Examples of the (meth)acrylic silicone dimer include a compound represented by the following formula (12).

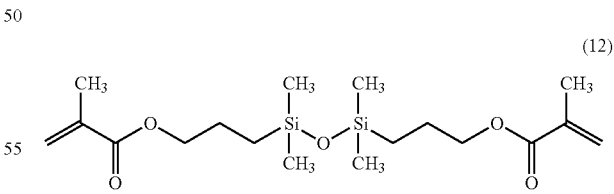

For instance, the compound represented by the formula (12), 1,1,3,3,5,5,7,7-octamethyltetrasiloxane and 1,3,5,7-tetramethyltetrasiloxane are mixed in a proper amount and subjected to a equilibration reaction in the presence of a trifluoromethanesulfonic acid catalyst. Subsequently, the reaction mixture is neutralized and generated components having a low boiling temperature are stripped off at a reduced pressure to obtain an organohydrogenpolysiloxane represented by the following formula (13).

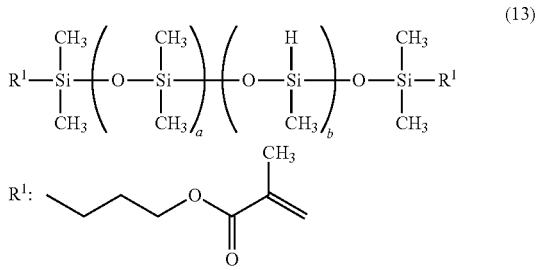

wherein a and b are as defined above.

The present silicone copolymerizes with other monofunctional monomer to provide a polymer having a crosslinking structure. The monofunctional monomer means a monomer having one group which is polymerizable with the present silicone, hereinafter referred to as "polymerizable monomer" or "hydrophilic monomer". The silicone of the present invention is well compatible with the polymerizable monomer. Therefore, the silicone copolymerizes with the polymerizable monomer to provide a colorless and transparent copolymer. In the copolymerization, an amount of the present silicone is 1 to 50 parts by mass, preferably 10 to 40 parts by mass, relative to a total 100 parts by mass of the present silicone and the polymerizable monomer. The present silicone may be polymerized singly so as to make a polymer for preparing ophthalmic lenses.

Examples of the polymerizable monomer include monomers having a (meth)acryloyl group, a styryl group, an allyl group, a vinyl group, or other polymerizable carbon-carbon unsaturated bonding, such as (meth)acrylic acid, itaconic acid, crotonic acid, cinnamic acid, vinyl benzoic acid, methyl(meth)acrylate, ethyl(meth)acrylate, polyalkylene glycol mono(meth)acrylate, polyalkylene glycol monoalkyl ether (meth)acrylate, trifluoroethyl (meth)acrylate, 2-hydroxyethyl (meth)acrylate, 2,3-dihydroxypropyl (meth)acrylate, N,N-dimethyl acrylamide, N,N-diethyl acrylamide, N-acryloyl morpholine, N-methyl (meth)acrylamide, N-vinyl pyrrolidone, styrene, vinylpyridine and maleimide. Tris-(trimethylsiloxysilyl)propylsilane monomer and bis-(trimethylsiloxysilyl)propylsilane monomer having polymerizable groups such as a (meth)acryl, styryl, or (meth) acrylamide group can be used.

Further, other monomers which function as a crosslinking component may be polymerized with the present silicone and the aforesaid polymerizable monomer. Examples of the crosslinking monomer include ethylene glycol dimethacrylate, diethylene glycol dimethacrylate, triethylene glycol dimethacrylate, polyethylene glycol dimethacrylate, trimethylol propane trimethacrylate, pentaerythritol tetramethacrylate, bisphenol-A-dimethacylate, vinylmethacylate and allylmethacylate; and acrylates of those compounds; triallyl isocyanurate, divinyl benzene, and N,N-methylenebisacrylamide. The amount of the crosslinking monomer may be preferably 0.1 to 10 parts by mass, relative to total 100 parts by mass of the polymerizable monomers.

The copolymerization of the present compound and the other polymerizable monomer mentioned just above may be carried out in conventional known manners. For instance, known polymerization initiator such as thermal polymerization initiators or photo polymerization initiators may be used. Examples of the polymerization initiator include benzoin ethyl ether, benzil dimethylketal, α,α'-diethoxyacetophenone, 2,4,6-trimethylbenzoyl diphenylphosphine oxide, 2-hydroxy-2-methyl-1-phenyl-propane-1-one, azobis isobutyronitrile, azobis dimethylvaleronitrile, benzoyl peroxide, tert-butyl hydroperoxide, and cumene hydroperoxide. The polymerization initiator may be used singly or two or more of them may be used in combination. The amount of the polymerization initiator is 0.001 to 2 parts by mass, preferably 0.01 to 1 part by mass, relative to 100 parts by mass of a total amount of the polymerizable components.

A (co)polymer having a unit derived from the silicone in the present invention has high oxygen permeability, hydrophilicity and stain resistance and excellent durability of mechanical strength. Therefore, the present silicones are suitable as materials for preparing ophthalmic devices such as contact lenses, intraocular lenses and artificial corneas. A method for preparation of the ophthalmic device with the present polymer may be any conventional ones. For instance, a machining method and a molding method may be used for forming lenses such as contact lenses and intraocular lenses.

EXAMPLES

The present invention will be explained below in further detail with reference to a series of the Examples and the Comparative Examples, though the present invention is in no way limited by these Examples.

In the following descriptions, a viscosity was determined by a Cannon-Fenske viscosimeter and a specific gravity was determined by a hydrometer. A refraction index was determined by a digital refractometer RX-5000, ex Atago Co., Ltd. $^1$H-NMR analysis was conducted by JNM-ECP500, ex JEOL Ltd. with deuteriochloroform as a measuring solvent.

Synthesis Example 1

First Step

In a 500-milliliter flask equipped with a stirring device, a dimroth condenser, a thermometer and a dropping funnel, put were 26.7 g (0.066 mol) of the compound represented by the following formula (14) and 194 g of isopropyl alcohol, and heated to 70 degrees C. 0.35 Gram of a solution of a catalyst, i.e., complex of alkali-neutralized chloroplatinic acid with vinyl siloxane, in toluene, containing 0.5% of platinum, was added in the flask. Then, 70.4 g (0.01 mol) of the compound represented by the following formula (15) was added dropwise in the flask through the dropping funnel over two hours. Thus, a ratio of the number of unsaturated hydrocarbon group in the compound represented by formula (14) to the number of the SiH group in the compound represented by the following formula (15) was 1.1.

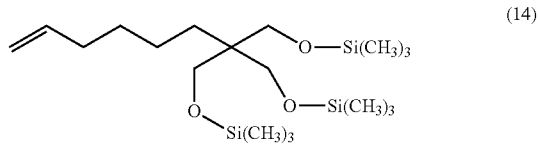

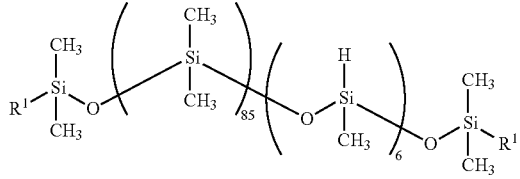

-continued

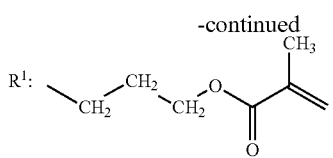

The reaction mixture was held at 70 degrees C. for 7 hours and, then, the amount of the remaining SiH group in the reaction mixture was determined by the method described below. The amount of the remaining SiH group was 2% or less of the amount of the SiH group before the reaction, which means that the reaction was completed. The isopropyl alcohol was stripped off at a reduced pressure to obtain 91 g of an oily crude product including a compound represented by the following formula (16).
The amount of the remaining SiH group was determined in the following manner.

Precisely 10 grams of a sample is placed in a 100-milliliter Meyer flask and dissolved in 10 ml of n-butanol, to which 20 ml of a 20% aqueous solution of sodium hydroxide is gradually added, so that hydrogen gas generates. The amount of the hydrogen gas generated is determined with a gas burette and reduced to an amount at 0 degree C. and 1 atom according to the following formula:

Amount of the hydrogen gas generated, ml/g,
=0.359×P×V/T×S wherein P is a pressure in the determination, mmHg, V is an amount of the hydrogen gas generated, ml; T is 273+t, wherein t is a temperature, ° C., of the hydrogen gas generated, equal to a temperature in the determination; and S is an amount of the sample.

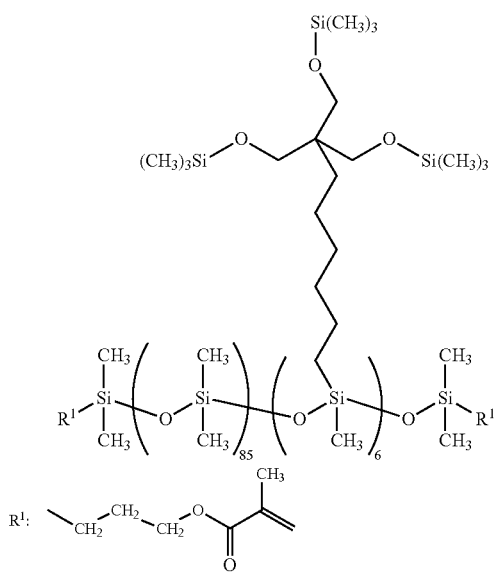

Second Step

In a 500-milliliter flask equipped with a stirring device, a dimroth condenser, and a thermometer, put were 69.2 grams of the oily crude product obtained, 146 grams of isopropyl alcohol, and 2.2 g of a 1 mass % solution of trifluoromethanesulfonic acid in methanol, that is 100 ppm of trifluoromethanesulfonic acid based on the total amount of the components, and heated to 70 degrees C. The mixture was allowed to react for 5 hours. The isopropyl alcohol was stripped off at a reduced pressure to obtain 57 g of an oily crude product. The oily crude product was dissolved in 120 g of acetone and washed with 30 g of water. The dissolution and washing procedure was repeated further twice. Alkenyl alcohol represented by the following formula, as an impurity, was extracted in a water/acetone phase to be removed.

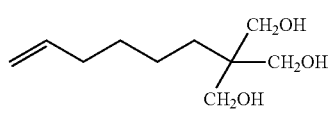

0.0007 g (100 ppm) of 4-methoxyphenol and 0.0007 g (100 ppm) of 2,6-di-t-butyl-4-methylphenol were added to 74 g of the cloudy lower layer from the extraction and the mixture was subjected to a stripping at a reduced pressure to obtain 45 g of a colorless and transparent oily product at a yield of 71.4%. $^1$H-NMR analysis showed that the product was a silicone represented by the following formula (17), hereinafter referred to as silicone 1. It had a viscosity of 25000 mm$^2$/s at 25 degrees C., a specific gravity of 0.986 at 25 degrees C. and a refraction index of 1.4201.

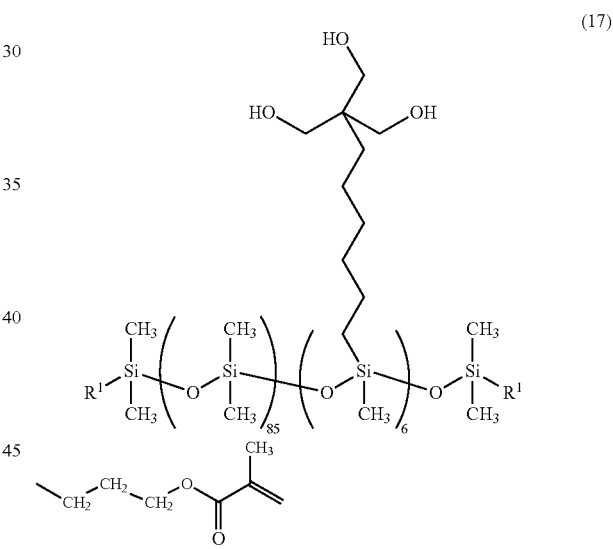

$^1$H-NMR spectra data of silicone 1 were as shown below.
0.1 ppm (540H), 0.4 ppm (12H), 0.5 ppm (4H), 1.0 to 1.3 ppm (60H), 1.6 ppm (4H), 1.9 ppm (6H), 2.6 ppm (18H) 3.6 ppm (36H), 4.0 ppm (4H), 5.5 ppm (2H), 6.0 ppm (2H)

Example 2

The procedures of Example 1 were repeated, except that 24.8 g (0.066 mol) of the compound represented by the following formula (18) was used in place of the compound represented by the formula (14) to thereby obtain 39.9 g of a colorless and transparent silicone at a yield of 67%. $^1$H-NMR analysis showed that the product was a silicone represented by the following formula (19), hereinafter referred to as silicone 2. It had a viscosity of 26000 mm$^2$/s at 25 degrees C., a specific gravity of 0.984 at 25 degrees C. and a refraction index of 1.4206.

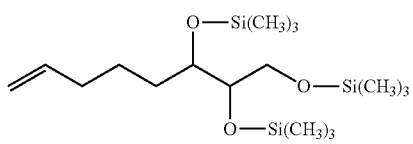

(18)

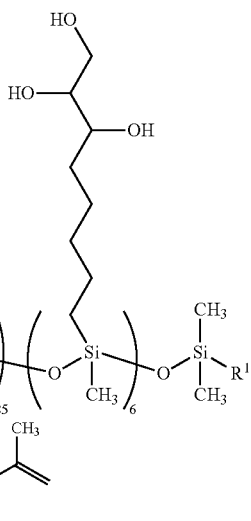

(19)

¹H-NMR spectra data of silicone 2 were as shown below.

0.1 ppm (540H), 0.4 to 0.6 ppm (16H), 1.2 to 1.5 ppm (48H), 1.7 ppm (4H), 1.9 ppm (6H), 3.0 ppm (18H), 3.5 ppm (12H), 3.7 ppm (12H), 5.5 ppm (2H), 6.1 ppm (2H)

Comparative Synthesis Example 1

The procedures of Examples 18 and 19 described in Japanese Examined Patent Publication No. Sho62-29776, Patent Literature 1, were repeated, except that the compound represented by the aforesaid formula (15) was used in place of the organohydrogensilicone having methacryl groups at both terminals to synthesize a silicone represented by the following formula (20), hereinafter referred to as silicone 3.

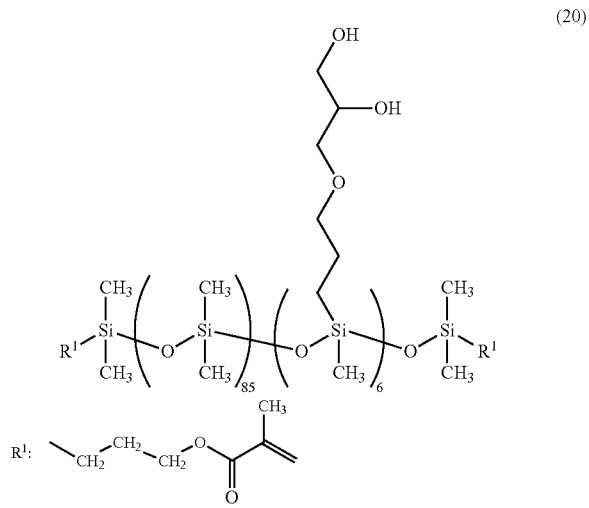

(20)

Comparative Synthesis Example 2

The procedures of Examples 1 and 2 described in Japanese Patent No. 5490547, Patent Literature 2, were repeated, except that the compound represented by the aforesaid formula (15) was used in place of the organohydrogensilicone having the methacryl groups at both terminals to synthesize a silicone represented by the following formula (21), hereinafter referred to as silicone 4.

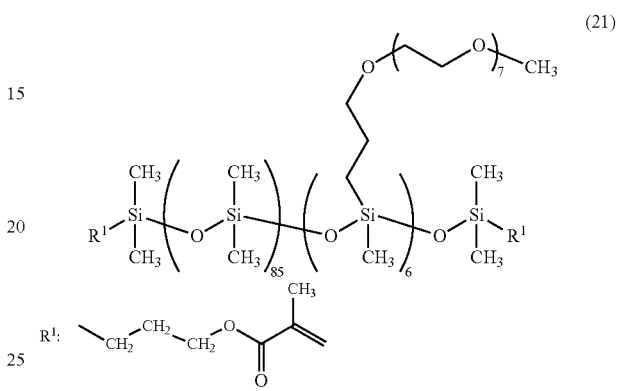

(21)

Preparation of a Silicone Mixture

Example 3

30 Parts by mass of silicone 1 prepared in Example 1, 70 parts by mass of N-vinyl-2-pyrrolidone, 0.1 part by mass of triallyl isocyanurate, and 0.1 part by mass of 2,4,6-trimethylbenzoyl diphenylphosphine oxide were mixed with stirring to obtain silicone mixture 1.

Example 4

The same components and the same manner as in Example 3 were used to obtain a silicone mixture, hereinafter referred to as silicone mixture 2, except that silicone 2 prepared in Example 2 was used instead of silicone 1.

Comparative Examples 1 and 2

In Comparative Example 1, the same components and the same manner as in Example 3 were used to obtain a silicone mixture, hereinafter referred to as silicone mixture 3, except that silicone 3 prepared in Comparative Synthesis Example 1 was used instead of silicone 1.

In Comparative Example 2, the same components and the same manner as in Example 3 were used to obtain a silicone mixture, hereinafter referred to as silicone mixture 4, except that silicone 4 prepared in Comparative Synthesis Example 2 was used instead of silicone 1.

[Evaluations]

(1) Compatibility of the Silicones with the Monomers

The appearances of the silicone mixtures obtained were observed visually. A mixture comprising a silicone having good compatibility with the other polymerizable monomers is colorless and transparent. In contrast, a mixture comprising a silicone having bad compatibility with the other polymerizable monomers is turbid. The results are as shown in Table 1.

(2) Appearance of a Film Obtained from the Silicone Mixture

Each of the silicone mixtures was deaerated in an argon atmosphere and poured into a mold having two quartz glass plates which faced each other. The silicone mixture was irradiated with light from an extra-high pressure mercury lamp for one hour to obtain a film having a thickness of approximately 0.3 mm. The appearance of the film was observed visually. The results are as shown in Table 1.

(3) Water Wettability or Hydrophilicity of a Film Obtained from the Silicone Mixture A water contact angle of the film prepared in (2) above was determined by a liquid drop method with a contact angle meter type CA-D, ex Kyowa Interface Science Co., LTD. The results are as shown in Table 1.

(4) Stain Resistance of a Film Obtained from the Silicone Mixture

Two films were prepared from each of the silicone mixture in the same manner as in (2) above. One of the twos was soaked in a buffered phosphate solution, PBS(−), at 37 degrees C. for 24 hours. The film after soaked and the other film without being soaked were stored in a well-known artificial lipid solution at 37 plus/minus 2 degrees C. for 8 hours. Then, the films were washed with PBS(−) and, subsequently, soaked in a 0.1% sudan black in a solution of sesame oil. When the colors were not different between the film after soaked and the film without being soaked, the film was evaluated as "good". When the colors were different between the film after soaked and the film without being soaked, that is, the film was stained with the sudan black sesame oil, the film was evaluated as "bad". The results are as shown in Table 1.

(5) Durability of Mechanical Strengths of a Film, Composed of the Polymer

Two films were prepared from each of the silicone mixture in the same manner as in (2) above. Water moisture, if any, on the surface of the films was wiped off. Then, one of the twos was soaked in a buffered phosphate solution, PBS(−), at 37 degrees C. for 24 hours. The film after soaked and the other film without being soaked were cut into test samples having a dumbbell shape of a width of 2.0 mm. The top and the bottom of the test sample were held by jigs and pulled at a constant speed. Tensile strength and elongation at break were determined with a tensile tester AGS-50NJ, ex Shimadzu Corporation. When change both in the tensile strength and the elongation at break after the soaking was not larger than 10%, it is evaluated as "good". When the change was larger than 10%, it is evaluated as "bad". The results are as shown in Table 1.

TABLE 1

|  | Example 3 | Example 4 | Comparative Example 1 | Comparative Example 2 |
|---|---|---|---|---|
| Silicone mixture | 1 | 2 | 3 | 4 |
| (1) Compatibility | Colorless and transparent | Colorless and transparent | Slightly turbid | Colorless and transparent |
| (2) Appearance of the film | Colorless and transparent | Colorless and transparent | Slightly cloudy | Colorless and transparent |
| (3) Water contact angle, ° | 43 | 44 | 50 | 36 |
| (4) Stain resistance | Good | Good | Bad | Good |
| (5) Durability of the mechanical strengths | Good | Good | Bad | Bad |

As shown in Table 1, silicone 3 used in Comparative Examples 1 was less compatible with the monomers and did not provide a colorless and transparent polymer. The mechanical strengths of the films obtained from the silicone mixtures in Comparative Examples 1 and 2 deteriorated during the soaking in the phosphate buffer solution. In contrast, the silicones of the present invention were well compatible with other polymerizable monomer and provided the colorless and transparent polymers. Further, the present silicones provided the polymers having the excellent water wettability and stain resistance, and their mechanical strengths did not deteriorate during the soaking in the phosphate buffer solution.

INDUSTRIAL APPLICABILITY

The present silicone provides a colorless and transparent polymer having an excellent hydrophilicity, stain resistance and durability of mechanical strengths. Accordingly, the present silicone and the present method for the preparation thereof are useful for preparing ophthalmic devices such as contact lenses, intraocular lenses and artificial corneas.

The invention claimed is:

1. A silicone of the following formula (1):

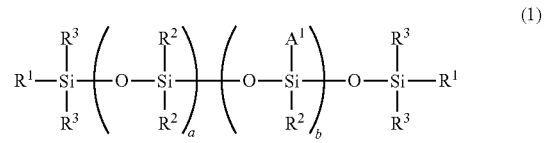

wherein
$R^1$ is, independently of each other, a group of the following formula (2):

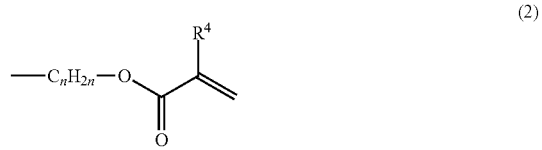

wherein n is an integer of from 2 to 8, and $R^4$ is a methyl group or a hydrogen atom,
$R^2$ is, independently of each other, a substituted or unsubstituted, monovalent hydrocarbon group having 1 to 10 carbon atoms,
$R^3$ is, independently of each other, an alkyl group having 1 to 6 carbon atoms,
$A^1$ is a group of the following formula (3):

wherein m is an integer of from 2 to 10, and X is an alkyl group, which may be branched, having three hydroxyl groups, X being a moiety of the formula $C_pH_{2p-2}(OH)_3$ in which p is an integer of from 1 to 6,
a is an integer of from 1 to 500,
b is an integer of from 1 to 100, and
a total of a and b is 50 to 600.

2. The silicone according to claim 1, wherein X is a group of the following formula (4) or (5)

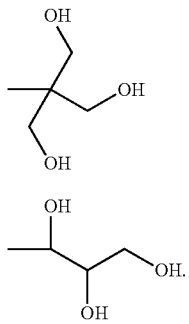
(4)

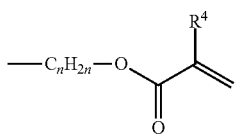
(5)

3. A polymer having repeating units derived from the silicone according to claim 1 or 2.

4. The polymer according to claim 3, having repeating units derived from said silicone and another compound having a group which is polymerizable with said silicone.

5. An ophthalmic device composed of the polymer according to claim 3.

6. A method for preparing a silicone of the following formula (1):

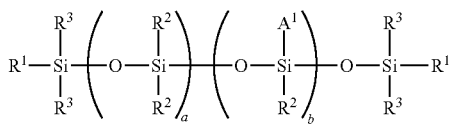
(1)

wherein $R^1$ is, independently of each other, a group of the following formula (2):

(2)

wherein n is an integer of from 2 to 8, and $R^4$ is a methyl group or a hydrogen atom,
$R^2$ is, independently of each other, a substituted or unsubstituted, monovalent hydrocarbon group having 1 to 10 carbon atoms, $R^3$ is, independently of each other, an alkyl group having 1 to 6 carbon atoms, $A^1$ is a group of the following formula (3):

$$C_mH_{2m}-X \quad (3)$$

wherein m is an integer of from 2 to 10, and X is an alkyl group, which may be branched, having three hydroxyl groups, X being a moiety of the formula $C_pH_{2p-2}(OH)_3$ in which p is an integer of from 1 to 6, a is an integer of from 1 to 500, b is an integer of from 1 to 100, and a total of a and b is 50 to 600, comprising steps of (i) addition reacting an organohydrogenpolysiloxane of the following formula (6):

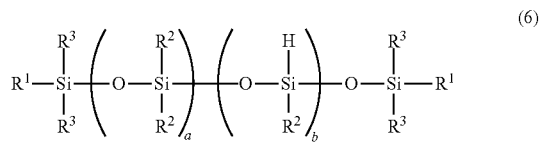
(6)

wherein $R^1$, $R^2$, $R^3$, a and b are as defined above; with a compound of the following formula (7):

(7)

wherein k is an integer of from 0 to 8, Y is a group of the formula $-C_pH_{2p-2}(OR)_3$, p is an integer of from 1 to 6, and R is a protective group for a hydroxyl group, to thereby prepare a compound of the following formula (8):

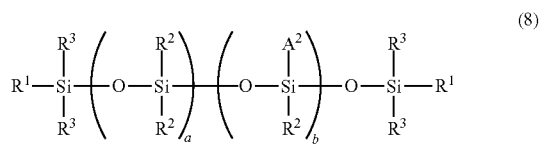
(8)

wherein $R^1$, $R^2$, $R^3$, a and b are as defined above and $A^2$ is a group of the following formula (9):

$$C_mH_{2m}-Y \quad (9)$$

wherein m is an integer of from 2 to 10 and Y is as defined above and (ii) removing the protective group, R, from the group of the formula $-C_pH_{2p-2}(OR)_3$ in said compound of formula (8) to thereby prepare the silicone of the aforesaid formula (1).

7. The method according to claim 6, wherein Y is a group of the following formula (10) or (11)

(10)

(11)

wherein R is a protective group for a hydroxyl group.

8. The method according to claim 6 or 7, wherein the protective group, R, is a silyl group of the formula $-SiR^6R^7R^8$, wherein $R^6$, $R^7$ and $R^8$ are, independently of each other, an alkyl group having 1 to 4 carbon atoms, a phenyl group or a benzyl group.

9. The method according to claim 6, wherein the step (ii) is carried out in an alcohol in the presence of an acid.

\* \* \* \* \*